US005718770A

United States Patent [19]

Shah et al.

[11] Patent Number: 5,718,770
[45] Date of Patent: Feb. 17, 1998

[54] THERMALLY-INHIBITED PREGELATINIZED GRANULAR STARCHES AND FLOURS AND PROCESS FOR THEIR PRODUCTION

[75] Inventors: Manish B. Shah, Franklin Park, N.J.;
David J. Thomas, Eagan, Minn.;
Chung-Wai Chiu, Westfield, N.J.;
Roger Jeffcoat, Bridgewater, N.J.;
Douglas J. Hanchett, Wharton, N.J.

[73] Assignee: National Starch and Chemical Investment Holding Corporation, Wilmington, Del.

[21] Appl. No.: 587,627

[22] Filed: Jan. 17, 1996

Related U.S. Application Data

[63] Continuation-in-part of Ser. No. 481,963, Jun. 7, 1995, abandoned, which is a continuation-in-part of PCT/US95/00688, Jan. 19, 1995, which is a continuation-in-part of Ser. No. 296,211, Aug. 25, 1994, abandoned, and PCT/US94/08559, Jul. 29, 1994.

[51] Int. Cl.$^6$ .............................. C08B 30/12; C08B 30/00
[52] U.S. Cl. .................... 127/65; 127/29; 127/32; 127/67; 127/71
[58] Field of Search ................... 127/65, 29, 32, 127/67, 71

[56] References Cited

U.S. PATENT DOCUMENTS

| | | | |
|---|---|---|---|
| 2,274,789 | 3/1942 | Horesi | 127/38 |
| 2,317,752 | 4/1943 | Fuller | 127/33 |
| 2,373,016 | 4/1945 | Daly et al. | 127/70 |
| 2,427,328 | 9/1947 | Schopmeyer et al. | 127/32 |
| 2,590,912 | 4/1952 | Yarber | 127/32 |
| 2,661,349 | 12/1953 | Caldwell et al. | 260/224 |
| 2,791,512 | 5/1957 | Hatch et al. | 106/208 |
| 2,897,086 | 7/1959 | Sowell et al. | 99/139 |
| 2,951,776 | 9/1960 | Scallet et al. | 127/71 |
| 3,155,527 | 11/1964 | Mentzer | 106/210 |
| 3,331,697 | 7/1967 | Salamon | 106/213 |
| 3,399,081 | 8/1968 | Bernetti et al. | 127/71 |
| 3,408,214 | 10/1968 | Mentzer | 106/212 |
| 3,463,668 | 8/1969 | Evans et al. | 127/32 |
| 3,477,903 | 11/1969 | Semegran et al. | 161/266 |
| 3,490,917 | 1/1970 | Doe et al. | 99/93 |
| 3,515,591 | 6/1970 | Feldman et al. | 127/32 |
| 3,563,798 | 2/1971 | Germino et al. | 127/32 |
| 3,578,497 | 5/1971 | Hjermstad | 127/32 |
| 3,607,394 | 9/1971 | Germino et al. | 127/32 |
| 3,607,396 | 9/1971 | Germino et al. | 127/71 |
| 3,640,756 | 2/1972 | Beersma et al. | 117/6 |
| 3,690,938 | 9/1972 | Swift | 117/122 |
| 3,725,387 | 4/1973 | McClendon et al. | 260/233.3 |
| 3,810,783 | 5/1974 | Bomball | 117/122 |
| 3,844,807 | 10/1974 | Bramel | 106/213 |
| 3,949,104 | 4/1976 | Cheng et al. | 426/578 |
| 3,950,593 | 4/1976 | Bomball | 428/476 |
| 3,967,975 | 7/1976 | Idaszak | 127/23 |
| 3,977,897 | 8/1976 | Wurzburg et al. | 127/71 |
| 4,013,799 | 3/1977 | Smalligan et al. | 426/578 |
| 4,131,574 | 12/1978 | Isherwood et al. | 260/17.3 |
| 4,256,509 | 3/1981 | Tuschhoff et al. | 127/32 |
| 4,266,348 | 5/1981 | Ledding | 34/10 |
| 4,280,851 | 7/1981 | Pitchon et al. | 127/33 |
| 4,303,451 | 12/1981 | Seidel et al. | 127/32 |
| 4,303,452 | 12/1981 | Ohira et al. | 127/32 |
| 4,329,181 | 5/1982 | Chiu et al. | 106/213 |
| 4,366,275 | 12/1982 | Silano et al. | 524/47 |
| 4,391,836 | 7/1983 | Chiu | 426/578 |
| 4,428,972 | 1/1984 | Wurzburg et al. | 426/578 |
| 4,465,702 | 8/1984 | Eastman et al. | 426/578 |
| 4,491,483 | 1/1985 | Dudacek et al. | 127/33 |
| 4,575,395 | 3/1986 | Rudin | 127/32 |
| 4,600,472 | 7/1986 | Pitchon et al. | 159/4 B |
| 4,610,760 | 9/1986 | Kirkpatrick et al. | 159/4.01 |
| 4,847,371 | 7/1989 | Schara et al. | 536/111 |
| 5,037,929 | 8/1991 | Rajagopalan et al. | 426/578 |
| 5,085,228 | 2/1992 | Mooney et al. | 131/37 |
| 5,087,649 | 2/1992 | Wegner et al. | 524/30 |
| 5,149,799 | 9/1992 | Rubens | 536/102 |
| 5,155,140 | 10/1992 | Marten et al. | 523/100 |
| 5,181,959 | 1/1993 | Nagai et al. | 106/211 |
| 5,329,004 | 7/1994 | Eden et al. | 536/109 |
| 5,368,690 | 11/1994 | Solarek et al. | 162/175 |

FOREIGN PATENT DOCUMENTS

| | | | |
|---|---|---|---|
| 1 150 934 | of 0000 | Canada | B01J 8/22 |
| 0 129 227 | 12/1984 | European Pat. Off. | C08B 31/00 |
| 0 057 338 | 3/1988 | European Pat. Off. | C08B 31/16 |
| 0 321 216 A2 | 6/1989 | European Pat. Off. | C08B 37/00 |
| 0 415 385 | 3/1991 | European Pat. Off. | C08B 31/16 |
| 0 490 424 | 6/1992 | European Pat. Off. | C08B 30/16 |
| 63/194725 | of 0000 | Japan | A61K 7/00 |
| 61-254602 | 11/1986 | Japan | C08B 30/12 |
| 263897 | 12/1926 | United Kingdom | 127/58 |
| 530226 | 12/1940 | United Kingdom | 127/71 |
| 595552 | 12/1947 | United Kingdom | C08B 30/12 |
| 1224281 | 10/1971 | United Kingdom | C13L 1/00 |
| 1479515 | 7/1977 | United Kingdom | A23L 1/0522 |
| WO 95/04082 | 2/1995 | WIPO | C08B 30/12 |

OTHER PUBLICATIONS

Copy of PCT Search Report for PCT/US96/00988.
Copy of PCT Search Report for PCT/US96/00999.
Irving Martin, *Journal of Applied Polymer Science*, "Crosslinking of Starch by Alkaline Roasting", vol. 11, No. 5, pp. 1283–1288 (May 1967).

(List continued on next page.)

*Primary Examiner*—Elizabeth Wood
*Assistant Examiner*—Patricia L. Hailey
*Attorney, Agent, or Firm*—Margaret B. Kelley

[57] ABSTRACT

Pregelatinized granular starches and flours are thermally inhibited by dehydrating a starch to anhydrous or substantially anhydrous and then heat treating the dehydrated starch at a temperature and for a time sufficient to inhibit the starch. The starch may be pregelatinized prior to or after the thermal inhibition using methods known in the art which retain the granular integrity. Preferably, the pH of the starch or flour is raised to 7.0 or above prior to the thermal inhibition steps. The dehydration step may be carried out by directly heating the starch, by extracting the starch with a solvent, or by freeze drying the starch. Preferably protein and/or lipids are removed prior to or after the thermal inhibition.

31 Claims, No Drawings

OTHER PUBLICATIONS

J.W. Donovan et al., *Cereal Chemistry*, "Differential Scannign Calorimetry of Heat–Moisture Treated Wheat and Potato Starches", vol. 60, No. 5, pp. 381–387 (1983), month n/a.

Rolf Stute, *Starch/Stärke*, "Hydrothermal Modification of Starches" The Difference Between Annealing and Heat/Moisture Treatment, vol. 44, No. 6, pp. 205–214 (1992), Apr. 1991.

Copy of PCT Search Reports for PCT/US95/00688, PCT/US95/00684, PCT/US94/08559, and PCT/US95/09138.

L. Sair et al., *Industrial and Engineering Chemistry*, "Water Sorption by Starches", vol. 36, No. 3, pp. 18–21, month N/A.

Dong–Hyun Lee et al., *Chem. Eng. Technol.*, "Drying Characteristics of Starch in an Inert Medium Fluidized Bed", vol. 16, pp. 263–269 (1993), month N/A.

"The bepex Fluid Bed" (Bulletin), month N/A.

Cristina Ferrero et al., *Journal of Food Processing and Preservation*, "Stability of Frozen Starch Pastes: Effect of Freezing, Storage and Xanthan Gum Addition", vol. 17, pp. 191–211 (1993), Apr. 1993.

Smelik et al. "Process for Manufacture of Starch with Reduced Gluten Content", C.A. Abstract 108, No. 20 169546S (1988), month N/A.

P.H. List et al., "Hagers Handbuch der Pharmazeutischen Praxis", 1977 month N/A.

"Handbook of Pharmaceutical Excipients", 1986, month N/A.

Ullmanns Encyclopädie der technischen Chemie, vol. 22, 1982 month NA.

Copy of PCT Search Reports for PCT/US95/00684, PCT/US95/00682, PCT/US96/00613, PCT/US96/00612, PCT/US96/07076, PCT/US96/00629 and PCT/US96/07071.

THERMALLY-INHIBITED PREGELATINIZED GRANULAR STARCHES AND FLOURS AND PROCESS FOR THEIR PRODUCTION

This application is a continuation-in-part of Ser. No., 08/481,963 filed Jun. 7, 1995, now abandoned, which is a continuation-in-part of PCT/US95/00688 filed Jan. 18, 1995, now pending, which is a continuation-in-part of Ser. No. 08/296,211 filed Aug. 25, 1994, now abandoned, and PCT/US94/08559 filed Jul. 29, 1994, now pending.

BACKGROUND OF THE INVENTION

This invention relates to pregelatinized granular starches and flours that are inhibited and to a process for their preparation.

Native starch granules are insoluble in cold water. When native granules are dispersed in water and heated, however, they become hydrated and swell. Then, with continued heating, shear, or conditions of extreme pH, the gelatinized granules fragment and the starch molecules are dispersed in the water, i.e., solubilized.

Depending on the starch base, the pregelatinized starch will exhibit specific texture and viscosity characteristics after the starch is dispersed in water. Starches containing amylose will exhibit a gel-like or non-cohesive texture. Starches containing high levels of amylose, for example, over 40%, will set to a very firm gel. Starches contain mainly amylopectin, i.e., waxy starches, do not provide the same gel characteristics as amylose-containing starches. The dispersions of unmodified pregelatinized amylopectin-containing starches exhibit a cohesive and runny texture when dispersed in water.

The texture can be improved if the starches are chemically crosslinked prior to pregelatinization. The crosslinks reinforce the associative hydrogen bonds holding the granules together, inhibit the swelling and hydration of the starch granules during gelatinization, and consequently, the inhibited starch granules remain intact. When pregelatinized powders of the chemically crosslinked starches are dispersed in water, the dispersions have a non-cohesive and salve-like texture, which is described as heavy or short.

It is desirable for a pregelatinized starch to be bland in flavor. Many starches such as corn, sorghum, and wheat contain small quantities of unsaturated fatty acids. The fatty acids may develop rancid flavors during storage. In addition, the proteins present give the starches an undesirable cereal taste. Certain starches, such as corn and waxy maize, are not used in thickened food compositions due to "woody" or "popsicle stick" off-flavors resulting from pregelatinization. See U.S. Pat. No. 4,303,451 (issued Dec. 1, 1981 to W. C. Seidel) which discloses a method for preventing the development of "woody" off-flavors in pregelatinized waxy maize starches. The starch granules are heated, prior to gelatinization, at about 120°–200° C. for 0.1–24 hours. The heating time must be insufficient to effect dextrinization but sufficient to prevent formation of woody off-flavors during pregelatinization. The texture and flavor of corn, wheat, rice and sago were modified by this heat treatment, but these starches gave inconsistent and non-reproducible results in food compositions (see Col. 2, lines 14–18).

In some applications, chemically modified starches and flours are unacceptable or undesirable. Thus, there is a need for unmodified pregelatinized granular starches which have the textural properties of chemically crosslinked pregelatinized granular starches and which are substantially free of off tastes.

SUMMARY OF THE INVENTION

The present invention provides thermally-inhibited, pregelatinized granular starches and flours. These starches and flours are pregelatinized so that a majority of the starch granules are swollen, but remain intact. The starches and flours are also thermally inhibited which causes the starch or flour to have the viscosity and textural characteristics of a chemically crosslinked starch, but without the use of chemical reagents. The thermally-inhibited, pregelatinized granular starches or flours are dispersible in cold water and, if sufficiently inhibited, possess a non-cohesive and salve-like texture if the starch is an amylopectin-containing starch or a smooth and uniform gel-like texture if the starch is an amylose-containing starch.

The starches and flours may be pregelatinized first and subsequently thermally inhibited or they may be thermally inhibited first and subsequently pregelatinized.

The thermal inhibition process comprises the steps of (a) optionally pH adjusting the starch or flour to a pH of about 7.0 or above; (b) dehydrating the starch or flour until it is anhydrous or substantially anhydrous; and (c) heat treating the dehydrated (i.e., anhydrous or substantially anhydrous) starch or flour at a temperature and for a period of time sufficient to inhibit the starch or flour and preferably to render it non-cohesive. As used herein, "substantially anhydrous" means containing less than 1% moisture by weight.

If the pregelatinization process is performed first, a granular starch or flour is slurried in water, typically in a ratio of 1.2–2.0 of water to 1.0 part starch, and preferably the pH is adjusted to neutral or greater by the addition of a base. As used herein, "neutral" covers the range of pH values around pH 7 and is meant to include from about pH 6.5 to about pH 7.5. The slurry is pregelatinized using known pregelatinization procedures which do not disrupt the granular structure and then dried to about 2–15% moisture. The dried pregelatinized granular starch or flour is then thermally inhibited by dehydrating the starch or flour and then heat treating the dehydrated starch or flour.

Alternatively, if the starch or flour is to be pH adjusted, thermally inhibited, and then pregelatinized, the granular starch or flour is slurried in water, the pH is adjusted to neutral or greater by the addition of a base, and the starch or flour is dried to about 2–15% moisture. The dried granular starch or flour, either as is or after the pH adjustment, is thermally inhibited by dehydrating the starch or flour to anhydrous or substantially anhydrous and then heat treating the dehydrated granular starch or flour. The resulting granular thermally inhibited starch or flour is preferably washed with water and then pregelatinized using known procedures which do not disrupt the granular structure.

The dehydration may be a thermal dehydration or a non-thermal dehydration. The thermal dehydration is carried out by heating the starch in a convention oven or a microwave oven, or any other heating device for a time and at a temperature sufficient to reduce the moisture content to less than 1%, preferably 0%. Representative processes for carrying out the non-thermal dehydration include extracting the water from the granular starch or pregelatinized starch using a solvent, preferably a hydrophilic solvent, more preferably a hydrophilic solvent which forms an azeotropic mixture with water (e.g., ethanol) or freeze drying the granular starch.

After both the pregelatinization and thermal inhibition steps, the product can be washed by any known methods that will maintain granular integrity.

Removal of various proteins, lipids, and other off flavor components prior to or after the thermal inhibition improves the flavor (i.e., taste and aroma) of the thermally-inhibited starches. A sodium chlorite extraction of the protein from a non-pregelatinized starch is described hereafter. Other procedures which can be used for protein, lipid, and other off flavor component removal include washing the starch at an alkaline pH (e.g., pH 11–12) and/or treating the starch with proteases. Polar and non-polar solvents which have an affinity for proteins and/or lipids can also be used. Examples are alcohols (e.g., ethanol), ketones (e.g., acetone), ethers (e.g., dioxane), aromatic solvents (e.g., benzene or toluene), and the like. For food applications, suitable food grade solvents should be used.

By varying the process conditions, including the initial pH of the starch or flour, the dehydrating method and conditions, and the heat treating temperatures, and the heat treating times, the level of inhibition can be varied to provide different viscosity characteristics in the final pregelatinized granular starches or flours. Inasmuch as the dehydrating and heat treating process parameters can be a function of the particular apparatus used for the thermal dehydrating and heat treating, the choice of apparatus will also be a factor in controlling of the level of inhibition.

These starches and flours are useful in food and industrial applications where chemically crosslinked pregelatinized granular starches are known to be useful.

DESCRIPTION OF THE PREFERRED EMBODIMENTS

The starches and flours can be derived from any source such as corn, pea, potato, sweet potato, barley, wheat, rice, sago, amaranth, tapioca, sorghum, waxy maize, waxy tapioca, waxy rice, waxy barley, waxy potato, waxy sorghum, and starches and flours having an amylose content of 40% or greater.

As used herein, a "native" starch is one as it is found in nature. The starches may be unmodified or modified by conversion (i.e., enzyme-, heat-, or acid-conversion), oxidation, phosphorylation, etherification, esterification, and/or chemical crosslinking. The flours may be modified by bleaching or enzyme conversion. These modifications may be carried out prior to or after the pregelatinizing step or prior to or after the dehydrating and heat treating steps.

The starches can be pregelatinized according to any of the known processes that result in the retention of the granular structure. Exemplary processes are disclosed in U.S. Pat. No. 4,280,851 (issued Jul. 28, 1981 to Pitchon et al.); U.S. Pat. No. 4,465,702 (issued Aug. 14, 1984); U.S. Pat. No. 5,037,929 (issued Aug. 6, 1991 to Rajagopalan et al.); and U.S. Pat. No. 5,149,799 (issued Sep. 22, 1992 to Rubens).

U.S. Pat. No. 4,280,851 describes a dual-atomization spray-drying process for preparing granular pregelatinized starches. A mixture of the granular starch in an aqueous solvent is injected through an atomization aperture in a nozzle assembly to form a finely divided spray. A heating medium is injected through a second aperture in the nozzle assembly into the spray of atomized starch to heat the starch to its gelatinization temperature. An enclosed chamber surrounds the atomization and heating medium injection apertures and defines a vent aperture positioned to enable the heated spray of starch to exit the chamber. The arrangement is such that the lapsed time between passage of the spray of starch through the chamber from the atomization aperture to the vent aperture defines the gelatinization time of the starch. The resulting spray-dried pregelatinized starch comprises uniformly gelatinized starch granules in the form of indented spheres, with a majority of the granules being whole and unbroken and swelling upon rehydration.

An apparatus for carrying out this dual atomization/spray-drying process is disclosed in U.S. Pat. No. 4,600,472 (issued Jul. 13, 1986 to Pitchon et al.). Nozzles suitable for use in the preparation of these starches are described in U.S. Pat. No. 4,610,760 (issued Sep. 9, 1986 to Kirkpatrick et al.). U.S. Pat. No. 4,847,371 (issued Jul. 11, 1989 to Schara et al.) discloses a dual-atomization process and apparatus similar to those of the Pitchon et al. patents.

U.S. Pat. No. 4,465,702 discloses a process for preparing a cold-water-swelling granular corn starch. An ungelatinized starch at 10–25 parts by weight is slurried in 50–75 parts by weight of an aqueous $C_2$–$C_3$ alkanol, and about 13–20 parts water. The alkanol and water mixture contains about 15–35 weight percent water including the water in the starch. The starch slurry is heated in a confined zone to a temperature of about 300°–360° F. for about 30 minutes. The pregelatinized granular starch is then recovered from the slurry.

U.S. Pat. No. 5,037,929 discloses a process for preparing cold-water-soluble granular starches. The starch granules are slurried in water and a polyhydric alcohol such as, 1,3-propanediol, butanediol, or glycerol. The slurry is heated to 80°–130° C. for about 3–30 minutes to convert the crystalline structure of the granules to single helix crystals or to an amorphous state while maintaining the granular integrity of the starch. The starch is recovered from the liquid phase.

U.S. Pat. No. 5,149,799 discloses a single atomization spray-drying process and an apparatus for preparing granular pregelatinized starches. The starch is slurried in an aqueous medium and a stream of the starch slurry is fed into an atomizing chamber within a spray nozzle at a pressure from about 50–200 psig. Steam is forced into the atomizing chamber at a pressure of 50–250 psig, and the starch is then simultaneously cooked and atomized as the steam forces the starch through a vent at the bottom of the chamber. The process takes place in a two-fluid, internal mix, spray nozzle. The process and the apparatus supply sufficient heat and moisture to the starch as it is being atomized to gelatinize the starch uniformly. The atomized starch is dried with a minimum of heat or shear effects as it exits the atomization chamber.

The amount of pregelatinization, and consequently, whether the starch will display a high or a low initial viscosity when dispersed in water, can be regulated by the pregelatinization procedures as known in the art. In general, if spray drying is used for the pregelatinization, the longer the residence time in the spray nozzle and the higher the ratio of steam to starch, the higher the initial viscosity of the pregelatinized starch when it is subsequently dispersed in water. Conversely, the lower the residence time, and the lower the amount of heat and moisture, the lower the viscosity.

In the first step of the thermal inhibition process the starch or the thermally-inhibited pregelatinized starch (hereinafter starch) is dehydrated for a time and at a temperature sufficient to render the starch anhydrous or substantially anhydrous. In the second step, the dehydrated (i.e., anhydrous or substantially anhydrous) starch is heat treated for a time and at a temperature sufficient to inhibit the starch.

When starches are subjected to heat in the presence of water, hydrolysis or degradation of the starch can occur. Hydrolysis and degradation will reduce the viscosity, thus limiting the effect of inhibition and is undesirable when a high viscosity product is desired. Therefore, the conditions for the dehydration of the starch need to be chosen so that inhibition is favored while reducing hydrolysis and degradation. Any conditions meeting that criteria can be used. Removing the water by solvent extraction or freeze drying is less likely to hydralyze the starch than directly heating the starch to drive off the water.

For the thermal dehydration suitable conditions are low temperatures or raising the pH of the starch before the dehydration. The preferred conditions for thermal dehydration consist in a combination of a low temperature and neutral to basic pH. Preferably, the temperatures used to dehydrate the starch are 125° C. or lower, more preferably between 100°–120° C. The dehydrating temperature can be lower than 100° C., but a temperature of at least 100° C. will be more effective in removing moisture.

The preferred pH is at least 7, most preferably greater than pH 8, typically pH 7.5–10.5, preferably 8–9.5. At a pH above 12, gelatinization more easily occurs; therefore, pH adjustments below 12 are more effective.

Buffers, such as sodium phosphate, may be used to maintain the pH if needed. An alternative method of raising the pH consists of spraying a solution of a base onto the starch or pregelatinized starch until the starch attains the desired pH, either during or prior to the thermal inhibition steps. Another method consists of infusing an alkaline gas, such as ammonia, into the starch, preferably during the thermal dehydration and heat treatment step. If the starch is not going to be used in a food, any workable or suitable inorganic or organic base that can raise the pH of starch may be used.

For food applications, suitable food grade bases for use in the pH adjustment step include, but are not limited to, sodium hydroxide, sodium carbonate, tetrasodium pyrophosphate, ammonium orthophosphate, disodium orthophosphate, trisodium phosphate, calcium carbonate, calcium hydroxide, potassium carbonate, potassium hydroxide, and any other base approved for food use under Food and Drug Administration laws or other food regulatory laws. Bases not approved for food use under these regulations may also be used, provided they can be washed from the starch so that the final product conforms to good manufacturing practices for the intended end use. The preferred food grade base is sodium carbonate. It should be noted that the textural and viscosity benefits of the thermal inhibition process tend to be enhanced as the pH is increased, although higher pHs tend to increase browning of the starch during the heat treating step.

For a laboratory scale dehydration with a solvent, the starch or flour (about 4–5% moisture) is placed in a Soxhlet thimble which is then placed in the Soxhlet apparatus. A suitable solvent is placed in the apparatus, heated to the reflux temperature, and refluxed for a time sufficient to dehydrate the starch or flour. Since during the refluxing the solvent is condensed onto the starch or flour, the starch or flour is exposed to a lower temperature than the solvent's boiling point. For example, during ethanol (boiling point about 78° C.) extraction the temperature of the starch is only about 40°–50° C. When ethanol is used as the solvent, the refluxing is continued for about 17 hours. The extracted starch or flour is removed from the thimble, spread out on a tray, and the excess solvent is allowed to flash off. With ethanol the time required for the ethanol to flash off is about 20–30 minutes. The starch or flour is immediately placed in a suitable heating apparatus for the heat treatment. For a commercial scale dehydration any continuous extraction apparatus is suitable.

For dehydration by freeze drying, the starch or flour (4–5% moisture) is placed on a tray and put into a freeze dryer. A suitable bulk tray freeze dryer is available from FTS Systems of Stone Ridge, N.Y. under the trademark Dura-Tap. The freeze dryer is run through a programmed cycle to remove the moisture from the starch or flour. The starch or flour temperature is held constant at about 20° C. and a vacuum is drawn to about 50 milliTorr (mT). The starch or flour is removed from the freeze dryer and immediately placed into a suitable heating apparatus for the heat treatment.

After the starch is dehydrated, it is heat treated for a time and at a temperature, or a range of temperatures, sufficient to inhibit the starch. The preferred heating temperatures are greater than 100° C. For practical purposes, the upper limit of the heat treating temperature is usually 200° C., at which temperature highly inhibited starches can be obtained. Typically the heat treating is carried out at 120°–180° C., preferably 140°–160° C., more preferably 160° C. The level of inhibition is dependent on the pH and heating temperature and time. For example, if the starch or flour is adjusted to pH 9.0 and the oven temperature is 160° C., a lightly inhibited starch or flour will require about 4–5 hours of heating, a moderately inhibited starch or flour will require about 5–6 hours of heating, and a highly inhibited starch or flour will require 6–8 hours of heating. For lower temperatures, longer heating times are required. When the starch or flour is at low pH, as with a native starch which has a pH of about 5.0–6.5, heating will provide less inhibition.

For flours lower temperatures and/or shorter heating times are required to reach the same level of inhibition as compared to the corresponding starch.

When the starch is thermally dehydrated, the dehydrating and heat treating steps can be continuous and can be accomplished by the application of heat to the starch beginning from ambient temperature. When a fluidized bed is used, the moisture will be driven off and the starch will be anhydrous before the temperature reaches about 125° C. After the starch or flour is anhydrous or substantially anhydrous, and while the heating is continued, some level of inhibition will be attained simultaneously, or even before, the final heat treating temperature is reached.

The starches or flours may be inhibited individually, or more than one may be inhibited at the same time. They may also may be inhibited in the presence of other materials or ingredients which will not interfere with the thermal inhibition process or alter the properties of the thermally inhibited pregelatinized granular starches or flours.

The thermal dehydrating and heat treating steps may be performed at normal pressures, under vacuum or under pressure, and may be accomplished using any means known in the art. The preferred method is by the application of dry heat in dry air or in an inert gaseous environment.

The thermal dehydrating and heat treating apparatus can be any industrial oven, for example, conventional ovens, microwave ovens, dextrinizers, fluidized bed reactors and driers, mixers and blenders equipped with heating devices and other types of heaters, provided that the apparatus is fitted with a vent to the atmosphere so that moisture does not accumulate and precipitate onto the starch. Preferably, the apparatus is equipped with a means for removing water vapor from the apparatus, such as, a vacuum or a blower to sweep air from the head-space of the apparatus, or a fluidizing gas. The heat treating step can be accomplished in the same apparatus in which the thermal dehydrating step occurs and, most conveniently, is continuous with the dehydrating step.

The pregelatinized and thermally inhibited starches having high viscosities with low percentage breakdown in viscosity are obtained in shorter times in the fluidized bed reactor than conventional heating ovens. Suitable fluidizing gases are air and nitrogen. For safety reasons, it is preferable to use a gas containing less than 12% oxygen.

A suitable fluidized bed reactor is model number FDR-100, manufactured by Procedyne Corporation of New Brunswick, N.J. The cross-sectional are of the fluidized bed reactor is 0.05 sq meter. The starting bed height is 0.3 to 0.8 meter, but usually 0.77 meter. The fluidizing gas is air except where otherwise indicated and is used at a velocity of 5–21 meter/min. The sidewalls of the reactor panels are heated with hot oil, and the fluidizing gas is heated with an electric heater. The samples are loaded to the reactor and then the fluidizing gas is introduced, or are loaded while the fluidizing gas is being introduced. The samples are brought from ambient temperature to 125° C. until the samples become anhydrous, and are further heated to the specified heat treating temperatures. When the heat treating temperature is 160° C., the time to reach that temperature is less than three hours.

Following the heat treating step, the thermally-inhibited starch or flour may be screened to select a desirable particle size.

All the starches and flours used were granular and were provided by National Starch and Chemical Company of Bridgewater, N.J.

The controls for the test samples were from the same native sources as the test samples, were unmodified or modified as the test samples, and were at the same pH, unless otherwise indicated.

All starches and flours, both test and control samples, were prepared and tested individually.

Except where stated otherwise, the pH of the samples was raised by slurrying the starch or flour in water at 30–40% solids and adding a sufficient amount of a 5% sodium carbonate solution until the desired pH was reached.

The slurries were pregelatinized in a pilot size spray drier, Type I-KA#4F, from APV Crepaco, Inc., Dreyer Division, of Attleboro Falls, Mass., using a spray nozzle, Type 1/2 J, from Spraying Systems Company of Wheaton, Ill. The spray nozzle had the following configuration: fluid cap, 251376, and air cap, 4691312. The low initial cold viscosity samples were sprayed at a steam to starch ratio of 3.5–4.5 to 1, and the high initial cold viscosity samples were sprayed at a steam to starch ratio of 5.5–6.5 to 1. Moisture content of all samples after spray drying and before the dehydration step was 4–10%.

The test samples were dehydrated and heat treated in an oven or in the fluidized bed reactor previously described.

The moisture level of the samples at the final heating temperature was 0%. Portions of the samples dehydrated and heat treated in the fluidized bed were removed and tested for inhibition at the temperatures and times indicated in the tables.

The samples were tested for inhibition using the following Brabender Procedure.

The pregelatinized thermally inhibited granular starch to be tested was slurried in a sufficient amount of distilled water to give a 4.6% anhydrous solids starch slurry at pH 3 as follows: 132.75 g of sucrose, 26.55 g of starch, and the amount of acid or buffered acid and water indicated below were mixed for three minutes in a standard home Mixmaster blender at setting #1. For the Brabender viscosities reported in Example 1, 108 g of acetic acid and 405.9 g of water were used. For the Brabender viscosities reported in Example 2, 50 g of a sodium citrate/citric acid buffer (pH 3) and 366.7 g of water were used. The slurry was then introduced to the sample cup of a Brabender VISCO\Amylo\GRAPH fitted with a 350 cm/gram cartridge and the viscosity measured as the slurry was heated to 30° C. and held for ten minutes (10). The viscosity at 30° C. and ten minutes after hold at 30° C. were recorded. The viscosity data at these temperatures are a measurement of the extent of pregelatinization. The higher the viscosity data at 30° C., the greater the extent of granular swelling and hydration during the pregelatinization process.

Heating was continued up to 95° C. and held at that temperature for 10 minutes (10'). The peak viscosity and viscosity ten minutes after 95° C. were recorded in Brabender Units (BU) and used to calculate the percentage breakdown in viscosity according to the formula:

$$\% \text{ Breakdown} = \frac{\text{peak} - (95° \text{ C.} + 10')}{\text{peak}} \times 100$$

where "peak" is the peak viscosity in Brabender Units and "(95° C.+10')" is the viscosity in Brabender Units at ten minutes after 95° C. If no peak viscosity was reached, i.e., the data indicated a rising curve or a flat curve, the viscosity at 95° C. and the viscosity at 10 minutes after attaining 95° C. were recorded.

For pregelatinized starches, the level of viscosity when dispersed in cold water will be dependent on the extent to which the starch was initially cooked out during the pregelatinization process. If the granules are not fully swollen and hydrated during pregelatinization, gelatinization will continue when the starch is dispersed in water and heated. Inhibition is determined by a measurement of the starch viscosity when the starch is dispersed at 4.6% solids in water at pH 3 and heated to 95° C.

The instrument used to measure the viscosity is a Brabender VISCO\Amylo\GRAPH, (manufactured by C. W. Brabender Instruments, Inc., Hackensack, N.J.). The VISCO\Amylo\GRAPH records the torque required to balance the viscosity that develops when a starch slurry is subjected to a programmed heating cycle. The accuracy is ±2%.

When the pregelatinized starch has a high initial cold viscosity, meaning it was highly cooked out in the pregelatinization process, the resulting Brabender traces will be as follows: for a highly inhibited starch the trace will be a flat curve, indicating that the starch is already very swollen and is so inhibited that it is resisting any further gelatinization, or the trace will be a rising curve, indicating that further gelatinization is occurring at a slow rate and to a limited extent; for a less inhibited starch, the trace will show a dropping curve, indicating that some of the granules are fragmenting, but the overall breakdown in viscosity will be lower than that for a non-inhibited control, or will show a second peak, but the breakdown in viscosity will be lower than that for a non-inhibited control.

When the pregelatinized starch has a low initial cold viscosity, meaning it was not highly cooked out in the pregelatinization process and more cooking is needed to reach the initial peak viscosity, the resulting Brabender traces will be as follows: for a highly inhibited starch, the trace will be a rising curve, indicating that further gelatinization is occurring at a slow rate and to a limited extent; for a less inhibited starch, the trace will show a peak viscosity as gelatinization occurs, and then a drop in viscosity, but with a lower percentage breakdown in viscosity than a non-inhibited control.

The thermally-inhibited pregelatinized granular starches and controls in the following examples were prepared as described above and are defined in relation to data taken from Brabender curves using the above procedure.

Using data from Brabender curves, inhibition was determined to be present if during the Brabender heating cycle (i) the Brabender curve showed a continuous rising viscosity with no peak viscosity, indicating the pregelatinized starch was highly inhibited and resisted further gelatinization or (ii) the Brabender curve showed a second peak viscosity or a lower percentage breakdown in viscosity from peak viscosity compared to a non-inhibited control, indicating the starch had achieved some level of inhibition.

EXAMPLE 1

Samples of waxy maize were adjusted to pH 6.0, 8.0 and 10.0 and pregelatinized to both a high and a low initial viscosity, as described above. The pH-adjusted starches were dehydrated and heat treated in a fluidized bed at 160° C. for the indicated time. They were evaluated for inhibition.

The results are set out in the following tables.

| | Viscosity (BU) | | | | | Break- |
|---|---|---|---|---|---|---|
| | 30° C. | 30° C. + 10' | Peak | 95° C. | 95° C. + 10' | down (%) |
| Waxy Maize-pH 6.0 - High Initial Cold Viscosity | | | | | | |
| Control | 1280 | 960 | 960 | 170 | 90 | 91 |
| 0 min. | 700 | 980 | 700 | 610 | 370 | 47 |
| 30 min. | 600 | 910 | 720 | 690 | 370 | 49 |
| 90 min. | 450 | 780 | 915 | 740 | 400 | 56 |
| 150 min. | 360 | 590 | 925 | 800 | 500 | 46 |
| Waxy Maize-pH 6.0 - Low Initial Cold Viscosity | | | | | | |
| Control | 230 | 250 | 750 | 340 | 100 | 87 |
| 30 min. | 100 | 130 | 600 | 370 | 210 | 65 |
| 60 min. | 100 | 140 | 730 | 500 | 260 | 64 |
| 120 min. | 100 | 130 | 630 | 430 | 260 | 59 |
| 180 min. | 90 | 120 | 550 | 390 | 240 | 56 |
| Waxy Maize-pH 8.0 - High Initial Cold Viscosity | | | | | | |
| Control | 1400 | 1020 | 1020 | 270 | 100 | 90 |
| 0 min. at 160° C. | 700 | 1060 | 1050 | 760 | 280 | 73 |
| 60 min. at 160° C. | 260 | 600 | 1340 | 1200 | 780 | 42 |
| 90 min. at 160° C. | 240 | 440 | 1280 | 1240 | 1000 | 22 |
| 120 min. at 160° C. | 280 | 420 | 1320 | 1320 | 1280 | 3 |
| 150 min. at 160° C. | 120 | 200 | 860 | 860 | 820 | 7 |
| 180 min. at 160° C. | 180 | 260 | 980 | 980 | 920 | 8 |
| Waxy Maize-pH 8.0 - Low Initial Cold Viscosity | | | | | | |
| Control | 250 | 250 | 820 | 340 | 130 | 84 |
| 0 min. at 160° C. | 50 | 100 | 690 | 460 | 270 | 61 |
| 60 min. at 160° C. | 40 | 50 | 840 | 590 | 320 | 62 |
| 120 min. at 160° C. | 20 | 30 | 720 | 650 | 450 | 38 |
| 180 min. at 160° C. | 20 | 30 | 590 | 570 | 450 | 24 |
| Waxy Maize-pH 10 - High Initial Cold Viscosity | | | | | | |
| Control | 1010 | 740 | 1010 | 300 | 160 | 84 |
| 0 min at 140° C. | 550 | 850 | 1280 | 1080 | 750 | 41 |
| 0 min at 150° C. | 270 | 420 | 1680 | 1680 | 1540 | 8 |
| 0 min at 160° C. | 170 | 240 | — | 1180 | 1440 | rising |
| 30 min at 160° C. | 80 | 85 | — | 410 | 650 | rising |
| 60 min at 160° C. | 60 | 60 | — | 150 | 300 | rising |
| 90 min at 160° C. | 50 | 50 | — | 80 | 140 | rising |
| 120 min at 120° C. | 40 | 40 | — | 80 | 130 | rising |
| 150 min at 150° C. | 40 | 40 | — | 60 | 90 | rising |
| 160 min at 160° C. | 40 | 40 | — | 45 | 70 | rising |
| Waxy Maize-pH 10 - Low Initial Cold Viscosity | | | | | | |
| pH 10 | | | | | | |
| Control | 200 | 190 | 615 | 350 | 190 | 69 |
| 0 min at 130° C. | 110 | 180 | 1500 | 880 | 530 | 65 |
| 0 min at 150° C. | 50 | 80 | 1670 | 1540 | 1250 | 25 |
| 0 min at 160° C. | 30 | 30 | — | 1040 | 1320 | rising |
| 30 min at 160° C. | 30 | 30 | — | 380 | 640 | rising |
| 60 min at 160° C. | 30 | 30 | — | 150 | 310 | rising |
| 60 min at 160° C. | 10 | 10 | — | 50 | 120 | rising |

The data show some thermal inhibition was attained in all cases, and that increasing the initial pH and the time of heating increased the level of inhibition. For the samples at pH 6.0, at 0 and 30 minutes, the recorded peak is actually a second peak obtained after the initial high viscosity began to breakdown. For some of the examples at pH 10, no peak viscosity was reached, indicating a highly inhibited starch.

EXAMPLE 2

This example describes the preparation of thermally-inhibited pregelatinized granular starches from additional starch bases as well as a waxy maize starch. The granular starches were adjusted to the indicated pH, pregelatinized using the procedure previously described, and heat treated in an oven at 140° C. for the indicated time. The cook evaluation and Brabender results are shown below. In the table, the abbreviations "mod." means moderate, "sl." means slightly, and "v." means very.

| Cook Evaluation | | | |
|---|---|---|---|
| Waxy Maize | Cook | | |
| pH | Time (hr) | Viscosity | Cook Texture |
| 6 | 2 | mod. | sl. cohesive, smooth |
| 6 | 4 | mod. to thin | sl. cohesive, smooth |
| 6 | 6 | mod. | v. sl. cohesive, smooth |
| 6 | 8 | mod. | v. sl. cohesive, smooth |
| 8 | 2 | mod. | cohesive, smooth |
| 8 | 4 | mod. to heavy | sl. cohesive, smooth |
| 8 | 6 | mod. | v. sl. cohesive, smooth |
| 8 | 8 | mod. | v. sl. cohesive, smooth |
| 10 | 2 | mod. | sl. cohesive, smooth |
| 10 | 4 | mod. to heavy | non-cohesive, short, smooth |
| 10 | 6 | mod. | non-cohesive, short, smooth |

-continued

| | | | |
|---|---|---|---|
| 10 | 8 | mod. | non-cohesive, short, smooth |

Tapioca

| | | | |
|---|---|---|---|
| 6 | 2 | mod. to heavy | v. cohesive, long |
| 6 | 4 | mod. to heavy | cohesive |
| 6 | 6 | mod. | sl. cohesive, smooth |
| 6 | 8 | mod. | non-cohesive, short, smooth |
| 8 | 2 | mod. to heavy | v. cohesive |
| 8 | 4 | mod. to heavy | cohesive |
| 8 | 6 | mod. to heavy | non-cohesive, short, smooth |
| 8 | 8 | mod. to heavy | non-cohesive, short, smooth |
| 10 | 2 | mod. to heavy | cohesive, long |
| 10 | 4 | mod. to heavy | v. sl. cohesive, smooth |
| 10 | 6 | mod. | non-cohesive, short, smooth |
| 10 | 8 | mod. to heavy | non-cohesive, short, smooth |

Potato

| | | | |
|---|---|---|---|
| 6 | 2 | heavy to v. heavy | v. cohesive, long |
| 6 | 4 | heavy | cohesive |
| 6 | 6 | mod. to heavy | sl. cohesive |
| 6 | 8 | mod. to heavy | v. sl. cohesive |
| 8 | 2 | heavy to v. heavy | v. cohesive, long |
| 8 | 4 | v. heavy | sl. cohesive |
| 8 | 6 | heavy | non-cohesive, sl. set, smooth |
| 8 | 8 | mod. | non-cohesive, v. sl. set, smooth |
| 10 | 2 | heavy | v. cohesive |
| 10 | 4 | heavy to mod. | sl. cohesive, v. sl. set, smooth |
| 10 | 6 | heavy to mod. | non-cohesive, short, mod. set, smooth |
| 10 | 8 | heavy to mod. | non-cohesive, short, mod. set, smooth |

Brabender Results

| Heat Treatment Conditions | Viscosity (BU) | | | | | Break-down (%) |
|---|---|---|---|---|---|---|
| | 30° C. | 30° C. + 10' | Peak | 95° C. | 95° C. + 10' | |
| Waxy Maize (pH 8) | | | | | | |
| 2 hrs | 400 | 1115 | 1115 | 515 | 515 | 60 |
| 6 hrs | 400 | 955 | 1120 | 1120 | 1023 | 38 |
| Tapioca (pH 8) | | | | | | |
| 2 hrs | 1140 | 2685 | 2685 | 2685 | 880 | 78 |
| 6 hrs | 370 | 800 | 1110 | 1110 | 890 | 46 |

The results show that thermally-inhibited pregelatinized granular starches can be prepared using other starch bases and that for non-cohesive starches longer times and/or higher pHs are required when an oven rather than a fluidized bed is used for the dehydration and heat treatment.

EXAMPLE 3

This example shows that the starch can be thermally inhibited prior to the pregelatinization step. A granular waxy maize starch was adjusted to a pH of 9.5 and heat treated in the fluidized bed at 160° C. (320° F.) for the indicated time. The resultant starch was reslurried, pH adjusted to the indicated pH, and then pregelatinized in the spray drier previously described. Differences in the initial viscosity were achieved by varying the nozzle back pressure which was accomplished by changing the spray nozzle cap size. The spray nozzle cap size was 7 mm for the pH 5.5 and 8.5 samples and 10.0 mm for the pH 7.0 sample.

The Brabender results are shown below.

| pH | Heating Time (min) | Viscosity (BU) | | | | Break-down (%) |
|---|---|---|---|---|---|---|
| | | 30° C. + 10' | 95° C. | 95° C. + 10' | Peak | |
| 5.5 | 160 | 275 | 1020 | 920 | 1020 | 9.8 |
| 7.0 | 115 | 710 | 915 | 630 | 960 | 31.2 |
| 8.5 | 160 | 350 | 950 | 940 | 980 | 4.1 |

The results show that a highly inhibited starch, but with a lower initial viscosity, resulted when the heat treatment time was increased.

EXAMPLE 4

This example describes improving the flavor (i.e., taste and aroma) of a thermally-inhibited pregelatinized granular starch by a subsequent alcohol extraction.

A thermally-inhibited, pregelatinized granular waxy maize (adjusted to pH 9.5 and heat treated for 180 minutes in a fluidized bed at 160° C.) is placed in a Soxhlet extractor and allowed to reflux overnight (about 17 hrs) using ethanol as the solvent (bp~78° C.). The extracted starch is then laid on paper to allow the excess ethanol to flash off. The ethanol-extracted pregelatinized granular starch should have a blander, cleaner flavor with less aftertaste since both an ungelatinized granular waxy maize and a pregelatinized non-granular waxy maize which had been thermally inhibited under the same conditions and then ethanol extracted were improved in flavor.

EXAMPLE 5

This example describes the effect of the removal of various proteins, lipids, and other off flavor components on the flavor (i.e., taste and aroma) of a thermally-inhibited waxy maize.

Prior to either the pregelatinization process or the thermal inhibition process, the protein is extracted from a waxy maize starch as follows. The starch is slurried at W=1.5 (50 lbs starch to 75 lbs of water) and the pH is adjusted to 3–3.5 with sulfuric acid. Sodium chlorite is added to give 2% on the weight of the starch. The starch is steeped overnight at room temperature. The pH is raised to about 9.5 using a 3% sodium hydroxide solution and washed well prior to drying. The protein level of the starch should be reduced to about 0.1%. The protein level of the untreated waxy maize is about 0.3%.

This treatment should improve the flavor of the thermally-inhibited pregelatinized granular starches since this treatment of a thermally-inhibited granular waxy maize improved the flavor as reported below. Removal of various proteins, lipids, and other off flavor components is expected to improve the flavor of other starch bases and flours.

Using a one-sided, directional difference taste testing procedure, as described in "Sensory Evaluation Techniques" by M. Meilgaard et al., pp. 47–111 (CRC Press Inc., Boca Raton, Fla. 1987), the protein-reduced, thermally-inhibited granular waxy maize (adjusted to pH 9.5; dehydrated and heated for 90 min at 160° C. in a fluidized bed) was compared to a similar thermally-inhibited waxy maize which had not been protein-reduced prior to heat treatment.

For the taste test, 3% starch cooks (samples heated at 100° C. for 15 min) were prepared and panelists were asked to select which sample was "cleaner" in flavor. All tests were done in a sensory evaluation room under red lights in order to negate any color differences that may have been present between samples. The results are shown below:

| Trial # | Number of Panelists | Number of Positive Responses[1] | Significance Level ($\alpha$ risk)[2] |
|---|---|---|---|
| 1 | 15 | 12 | 5% |
| 2 | 14 | 11 | 5% |

[1] The number indicates those respondents who selected the protein-reduced product as being cleaner in flavor.
[2] The $\alpha$ values were determined from a statistical table. An $\alpha$ risk of 5% indicates (with 95% confidence) that the samples are statistically different, i.e., that the protein-reduced product is cleaner than the control.

The above results show that protein removal prior to the heat treatment helped to improve the flavor of the thermally-inhibited non-pregelatinized granular waxy maize starch.

Now that the preferred embodiments of the invention have been described in detail, various modifications and improvements thereon will become readily apparent to the practitioner. Accordingly, the spirit and scope of the present invention are to be limited only by the appended claims, and not by foregoing specification.

What is claimed is:

1. A starch or flour which is a thermally-inhibited, pregelatinized granular starch or flour.

2. The starch of claim 1, which, after dispersion in water, is characterized by its improved viscosity stability in comparison to the non-thermally-inhibited, pregelatinized granular starch base.

3. The starch or flour of claim 1, wherein the granular starch or flour is thermally inhibited and subsequently pregelatinized.

4. The starch or flour of claim 1, wherein the granular starch or flour is pregelatinized and subsequently thermally inhibited.

5. The starch or flour of claim 1, wherein the starch or flour is a cereal, root, tuber, legume or fruit starch or flour.

6. The starch or flour of claim 5, wherein the starch or flour is selected from the group consisting of banana, corn, pea, potato, sweet potato, barley, wheat, rice, sago, amaranth, tapioca, sorghum, V.O. hybrid waxy maize, waxy maize, waxy tapioca, waxy rice, waxy barley, waxy potato, waxy sorghum, and a starch or flour containing greater than 40% amylose.

7. The starch of claim 6, wherein the starch is the V.O. waxy maize, the waxy maize, the waxy tapioca, the waxy rice, the waxy barley, the waxy potato, or the waxy sorghum.

8. The starch of claim 1, wherein the starch is a modified starch and the modification is carried out prior to or after the pregelatinization and/or prior to or after the thermal inhibition.

9. The starch of claim 8, wherein the modified starch is selected from the group consisting of a converted starch, a derivitized starch, a chemically crosslinked starch, a derivatized and converted starch, a derivatized and chemically crosslinked starch, and a converted and chemically crosslinked starch.

10. The flour of claim 9, wherein the modified flour is a bleached and/or enzyme-converted flour.

11. The flour of claim 1, wherein the flour is a modified flour and the modification is carried out prior to or after the pregelatinization and/or prior to or after the thermal inhibition.

12. A process for preparing a thermally-inhibited and pregelatinized granular starch or flour, which comprises the steps of:

(a) pregelatinizing a starch or flour while maintaining granular integrity;
(b) thermally or non-thermally dehydrating a granular starch or flour to anhydrous or substantially anhydrous; and
(c) heat treating the dehydrated starch or flour at a temperature and for a time sufficient to inhibit the dehydrated starch or flour.

13. The process of claim 12, wherein the pregelatinizing step is carried out prior to the dehydrating and heat treating steps.

14. The process of claim 12, wherein the pregelatinizing step is carried our after the dehydrating and heat treating steps.

15. The process of claim 12, wherein the thermal dehydrating step is carried out by directly heating the granular starch or flour at 100° C. or greater.

16. The process of claim 12, wherein the dehydrating, and heat treating steps are carried out on the granular starch at about 120° to about 180° C. for up to 20 hours.

17. The process of claim 12, further comprising the step of increasing the pH of the granular starch or flour to neutral or greater prior to the simultaneous dehydrating and heat treating steps.

18. The process of claim 17, wherein the pH is raised to about 8 to about 9.5 prior to the simultaneous dehydrating and heat treating steps; and wherein the pregelatinizing step is carried out before the simultaneous dehydrating and heat treating steps.

19. The process of claim 17, wherein the pH is increased to about 8 to about 9.5 prior to the simultaneous dehydrating and heat treating steps; and wherein the pregelatinizing step is carried out after the simultaneous dehydrating and heat treating steps.

20. The process of claim 19, further comprising the step of washing the dehydrated and heat treated starch or flour with water prior to the pregelatiniling step.

21. The process of claim 12, further comprising the step of removing proteins and/or lipids from the starch or flour before or after the pH increasing step, the pregelatinizing step, the dehydrating step, the heat treating step, or the simultaneous dehydrating and heat treating steps.

22. The starch or flour of claim 21, which has a substantially improved flavor.

23. The process of claim 12, wherein the non-thermal dehydrating step is carried out by extracting the starch or flour with a solvent or by freeze drying the starch or flour.

24. A starch or flour which is a thermally-inhibited, granular pregelatinized starch or flour and which is prepared by a process which comprises the steps of:

(a) pregelatinizing a starch or flour while maintaining granular integrity;
(b) thermally or non-thermally dehydrating a granular starch or flour to anhydrous or substantially anhydrous; and
(c) heat treating the dehydrated starch or flour at a temperature of 100° C. or greater for a period of time sufficient to inhibit the starch or flour.

25. The starch or flour of claim 24, wherein the starch or flour is a cereal, root, tuber, legume or fruit starch or flour.

26. The starch or flour of claim 25, wherein the starch or flour is selected from the group consisting of banana, corn, pea, potato, sweet potato, barley, wheat, rice, sago, amaranth, tapioca, sorghum, V.O. hybrid waxy maize, waxy maize, waxy tapioca, waxy rice, waxy barley, waxy potato, waxy sorghum, and a starch or flour containing greater than 40% amylose.

27. The starch of claim 26, wherein the starch is the V.O. waxy maize, the waxy maize, the waxy tapioca, the waxy rice, the waxy barley, the waxy potato, or the waxy sorghum.

28. The starch of claim 24, wherein the starch is a modified starch and the starch modification is carried out prior to or after the pregelatinization and/or prior to or after the thermal inhibition step.

29. The starch of claim 28, wherein the modified starch is selected from the group consisting of a converted starch, a derivitized starch, a chemically crosslinked starch, a derivatized and converted starch, a derivatized and chemically crosslinked starch, and a converted and chemically crosslinked starch.

30. The flour of claim 24, wherein the flour is a modified flour and the modification is carried out prior to or after the pregelatinization and/or prior to or after the thermal inhibition.

31. The flour of claim 30, wherein the modified flour is a bleached and/or enzyme-converted flour.

* * * * *